US007480210B2

(12) United States Patent
Pikula et al.

(10) Patent No.: US 7,480,210 B2
(45) Date of Patent: Jan. 20, 2009

(54) WIRELESS SYNCHRONOUS TIME SYSTEM

(75) Inventors: Michael A. Pikula, Franklin, WI (US); Robin W. Gollnick, Lake Geneva, WI (US); Terrence J. O'Neill, Lake Geneva, WI (US)

(73) Assignee: Quartex, division of Primex, Inc., Lake Geneva, WI (US)

( * ) Notice: Subject to any disclaimer, the term of this patent is extended or adjusted under 35 U.S.C. 154(b) by 0 days.

(21) Appl. No.: 12/062,686

(22) Filed: Apr. 4, 2008

(65) Prior Publication Data

US 2008/0212412 A1 Sep. 4, 2008

Related U.S. Application Data

(60) Division of application No. 10/979,049, filed on Nov. 2, 2004, now Pat. No. 7,411,869, which is a continuation-in-part of application No. 10/876,767, filed on Jun. 25, 2004, and a continuation-in-part of application No. 09/960,638, filed on Sep. 21, 2001, now Pat. No. 6,873,573.

(51) Int. Cl.
*G04B 47/00* (2006.01)
*G04C 11/00* (2006.01)
*H04B 1/00* (2006.01)

(52) U.S. Cl. ............................ 368/10; 368/46; 368/47; 455/70

(58) Field of Classification Search ..................... 368/1, 368/46–47, 52, 72–74; 340/309.6, 309; 455/68, 70, 230, 231, 507
See application file for complete search history.

(56) References Cited

U.S. PATENT DOCUMENTS 3,643,420 A 2/1972 Haydon
3,681,914 A 8/1972 Loewengart
3,690,959 A 9/1972 Thompson
3,756,012 A 9/1973 Kiss
3,811,265 A 5/1974 Cater
3,998,043 A 12/1976 Tamaru et al.
4,023,344 A 5/1977 Mukaiyama
4,117,661 A 10/1978 Bryant, Jr.

(Continued)

FOREIGN PATENT DOCUMENTS

DE 4405099 8/1994

(Continued)

*Primary Examiner*—Vit W Miska
(74) *Attorney, Agent, or Firm*—Michael Best & Friedrich LLP

(57) ABSTRACT

A wireless synchronous time keeping system includes a primary device and a secondary device. The primary device includes a receiving unit to receive a first signal, a processor coupled to the receiving unit and operable to process the first signal to produce a processed time component, an internal clock to store and increment the component to produce a first internal time, and a transmitting unit to transmit a second signal having the first internal time and an event having an instruction and a time element. The secondary device includes a receiving unit to receive the second signal, an internal clock to store and increment the first internal time to produce a second internal time, a memory operable to store one or more messages, a display operable to display the messages, and an event switch operable to execute the instruction when the second internal time matches the time element.

4 Claims, 12 Drawing Sheets

U.S. PATENT DOCUMENTS

| | | | | |
|---|---|---|---|---|
| 4,177,454 | A | 12/1979 | Shinoda et al. | |
| 4,182,110 | A | 1/1980 | Kamiwaki et al. | |
| 4,395,135 | A | 7/1983 | Frantz | |
| 4,490,050 | A | 12/1984 | Singhi | |
| 4,525,685 | A | 6/1985 | Hesselberth et al. | |
| 4,536,093 | A | 8/1985 | Yoshida | |
| 4,582,434 | A | 4/1986 | Plangger et al. | |
| 4,677,541 | A | 6/1987 | Singhi | |
| 4,695,168 | A | 9/1987 | Meister et al. | |
| 4,702,613 | A | 10/1987 | Ohtawa | |
| 4,713,808 | A | 12/1987 | Gaskill et al. | |
| 4,763,309 | A | 8/1988 | Descombes | |
| 4,920,365 | A | 4/1990 | Marx et al. | |
| 4,953,149 | A | 8/1990 | Marvosh | |
| 4,956,826 | A | 9/1990 | Coyman et al. | |
| 5,056,070 | A | 10/1991 | Shibuya et al. | |
| 5,089,814 | A | 2/1992 | DeLuca et al. | |
| 5,160,853 | A | 11/1992 | Simon et al. | |
| 5,274,545 | A | 12/1993 | Allan et al. | |
| 5,282,180 | A | 1/1994 | Burke et al. | |
| 5,287,109 | A | 2/1994 | Hesse | |
| 5,293,355 | A | 3/1994 | Widen et al. | |
| 5,297,120 | A | 3/1994 | Yuzuki et al. | |
| 5,319,374 | A | 6/1994 | Desai et al. | |
| 5,375,018 | A | 12/1994 | Klausner et al. | |
| 5,387,903 | A | 2/1995 | Cutter et al. | |
| 5,425,004 | A | 6/1995 | Staffan | |
| 5,440,559 | A | 8/1995 | Gaskill | |
| 5,442,599 | A | 8/1995 | Burke et al. | |
| 5,510,797 | A | 4/1996 | Abraham et al. | |
| 5,521,887 | A | 5/1996 | Loomis | |
| 5,594,430 | A | 1/1997 | Cutter et al. | |
| 5,617,375 | A | 4/1997 | Bauman et al. | |
| 5,661,700 | A | 8/1997 | Weppler | |
| 5,677,895 | A | 10/1997 | Mankovitz | |
| 5,717,661 | A | 2/1998 | Poulson | |
| 5,805,530 | A | 9/1998 | Youngberg | |
| 5,859,595 | A | 1/1999 | Yost | |
| 5,889,736 | A | 3/1999 | Fujita et al. | |
| 5,982,147 | A | 11/1999 | Anderson | |
| 6,018,229 | A | 1/2000 | Mitchell et al. | |
| 6,061,304 | A | 5/2000 | Nagata et al. | |
| 6,069,848 | A | 5/2000 | McDonald et al. | |
| 6,205,090 | B1 | 3/2001 | Blount et al. | |
| 6,215,862 | B1 | 4/2001 | Lopes | |
| 6,236,623 | B1 | 5/2001 | Read et al. | |
| 6,269,055 | B1 | 7/2001 | Pikula et al. | |
| 6,288,977 | B1 | 9/2001 | Yoshida et al. | |
| 6,288,979 | B1 | 9/2001 | Kwok | |
| 6,304,518 | B1 | 10/2001 | O'Neill | |
| 6,324,495 | B1 | 11/2001 | Steinman | |
| 6,343,050 | B1 | 1/2002 | Kwok | |
| 6,377,517 | B1 * | 4/2002 | Tursich | 368/47 |
| 6,449,220 | B1 * | 9/2002 | Egle et al. | 368/46 |
| 6,493,338 | B1 | 12/2002 | Preston et al. | |
| 6,525,995 | B1 * | 2/2003 | Diehl et al. | 368/47 |
| 6,678,215 | B1 | 1/2004 | Treyz et al. | |
| 6,693,851 | B1 | 2/2004 | Fujisawa et al. | |
| 6,728,533 | B2 | 4/2004 | Ishii | |
| 6,738,635 | B1 | 5/2004 | Lewis et al. | |
| 6,816,439 | B1 | 11/2004 | Kawahara et al. | |
| 6,873,573 | B2 | 3/2005 | Pikula et al. | |
| 6,944,187 | B1 * | 9/2005 | Driediger et al. | 370/503 |
| 7,042,914 | B2 * | 5/2006 | Zerbe et al. | 370/516 |
| 7,139,225 | B2 * | 11/2006 | Farmer | 368/46 |
| 7,145,837 | B2 * | 12/2006 | Herring et al. | 368/46 |
| 2002/0018402 | A1 | 2/2002 | Egle et al. | |
| 2002/0098857 | A1 | 7/2002 | Ishii | |
| 2002/0186619 | A1 | 12/2002 | Reeves et al. | |

FOREIGN PATENT DOCUMENTS

| | | |
|---|---|---|
| DE | 19526635 | 1/1997 |
| DE | 19801688 | 7/1999 |
| EP | 0424772 | 5/1991 |
| WO | 8103233 | 11/1981 |

* cited by examiner

TIME PACKET STRUCTURE

FUNCTION PACKET STRUCTURE

WIRELESS SYNCHRONOUS TIME SYSTEM

RELATED APPLICATIONS

This patent application is a divisional of co-pending U.S. patent application Ser. No. 10/979,049, filed Nov. 2, 2004, which is a continuation-in-part of U.S. patent application Ser. No. 09/960,638, filed on Sep. 21, 2001, now U.S. Pat. No. 6,873,573, and Ser. No. 10/876,767, filed on Jun. 25, 2004, the entire contents of all of which are hereby incorporated by reference.

BACKGROUND OF THE INVENTION

The present invention relates to synchronous time systems and particularly to systems having "slave" devices synchronized by signals transmitted by a controlling "master" device. More particularly, the present invention relates to synchronous time systems, wherein the master device wirelessly transmits the signals to the slave devices.

Conventional hard-wired synchronous time systems (e.g., clock systems, bell systems, etc.) are typically used in schools and industrial facilities. The devices in these systems are wired together to create a synchronized system. Because of the extensive wiring required in such systems, installation and maintenance costs may be high.

SUMMARY OF THE INVENTION

Conventional wireless synchronous time systems are not hard-wired, but instead rely on wireless communication among devices to synchronize the system. For example, one such system utilizes a government WWVB radio time signal to synchronize a system of clocks. This type of radio controlled clock system typically includes a master unit that broadcasts a government WWVB radio time signal and a plurality of slave clocks that receive the time signal. To properly synchronize, the slave clock units must be positioned in locations where they can adequately receive the broadcast WWVB signal. Interference generated by power supplies, computer monitors, and other electronic equipment may interfere with the reception of the signal. Additionally, the antenna of a radio controlled slave clock can be de-tuned if it is placed near certain metal objects, including conduit, wires, brackets, bolts, etc., which may be hidden a building's walls. Wireless synchronous time systems that provide reliable synchronization and avoid high installation and maintenance costs would be welcomed by users of such systems.

According to the present invention, a wireless synchronous time system comprises a primary event device or "master" device including a first receiver operable to receive a global positioning system ("GPS") time signal, and a first processor coupled to the first receiver to process the GPS time signal. The primary event device also includes a memory coupled to the first processor and operable to store a programmed instruction, including a preprogrammed time element and a preprogrammed function element. The primary event device also includes an internal clock coupled to the first processor to store the time component and to increment relative to the stored time component thereafter to produce a first internal time. A transmitter is also included in the primary event device and is coupled to the first processor to transmit the first internal time and the programmed instruction.

The synchronized event system further includes a secondary event device or "slave" device having a second receiver to wirelessly receive the first internal time and the programmed instruction, which are transmitted by the primary event device. The secondary event device includes a second processor coupled to the second receiver to selectively register the programmed instruction, a second internal clock coupled to the processor to store the time component and to increment relative to the stored time component thereafter to produce a second internal time, and an event switch operable to execute the registered programmed instruction when the second internal time matches the preprogrammed time element of the programmed instruction.

In some embodiments, the secondary event device or "slave" device may include an analog clock, a digital clock, one or more time-controlled switching devices (e.g., a bell, a light, an electronic message board, a speaker, etc.), or any other device for which the functionality of the device is synchronized with other devices. In these devices, the programmed instruction includes an instruction to display time and/or an instruction to execute a function at a predetermined time. The programmed instruction is broadcast to the "slave" unit devices by the primary event device or "master" device. In this way, for example, the master device synchronizes the time displayed by a system of analog slave clocks, synchronously sounds a system of slave bells, synchronizes the time displayed by a system of slave digital clocks, or synchronizes any other system of devices for which the functionality of the devices of the system is desired to be synchronized. In some embodiments, the master device transmits multiple programmed commands (a "program") to the slave devices and the slave devices include a processor operable to execute the multiple programmed commands.

In some embodiments, these systems further include a power interrupt module coupled to the processors to retain the internal time and the programmed instruction in the event of a power failure. Both the "master" primary event device and the "slave" secondary event device are able to detect a power failure and store current time information into separate memory modules.

The system is synchronized by first receiving a GPS time signal at the master device and setting a first internal clock to the GPS time signal. The first internal clock is then incremented relative to the GPS time signal to produce a first internal time. Operational data in the form of the programmed instruction, including the preprogrammed time element and the preprogrammed function element, is then retrieved from a memory and is wirelessly transmitted along with the first internal time. A second receiver at the "slave" device wirelessly receives the first internal time and the operational data and selectively registers it. A second internal clock within the "slave" device is set to the first internal time and is incremented relative thereto to produce a second internal time. In preferred embodiments, such as an analog clock, the second internal time is simply displayed. In other slave devices, such as a system of bells, a function is identified from the preprogrammed function element and is executed (e.g., bells or alarms are rung) when the second internal time matches the preprogrammed time element.

Additional features and advantages will become apparent to those skilled in the art upon consideration of the following detailed description of preferred embodiments exemplifying the best mode of carrying out the invention as presently perceived.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings and can include electrical connections and couplings, whether direct or indirect.

Figure 1:
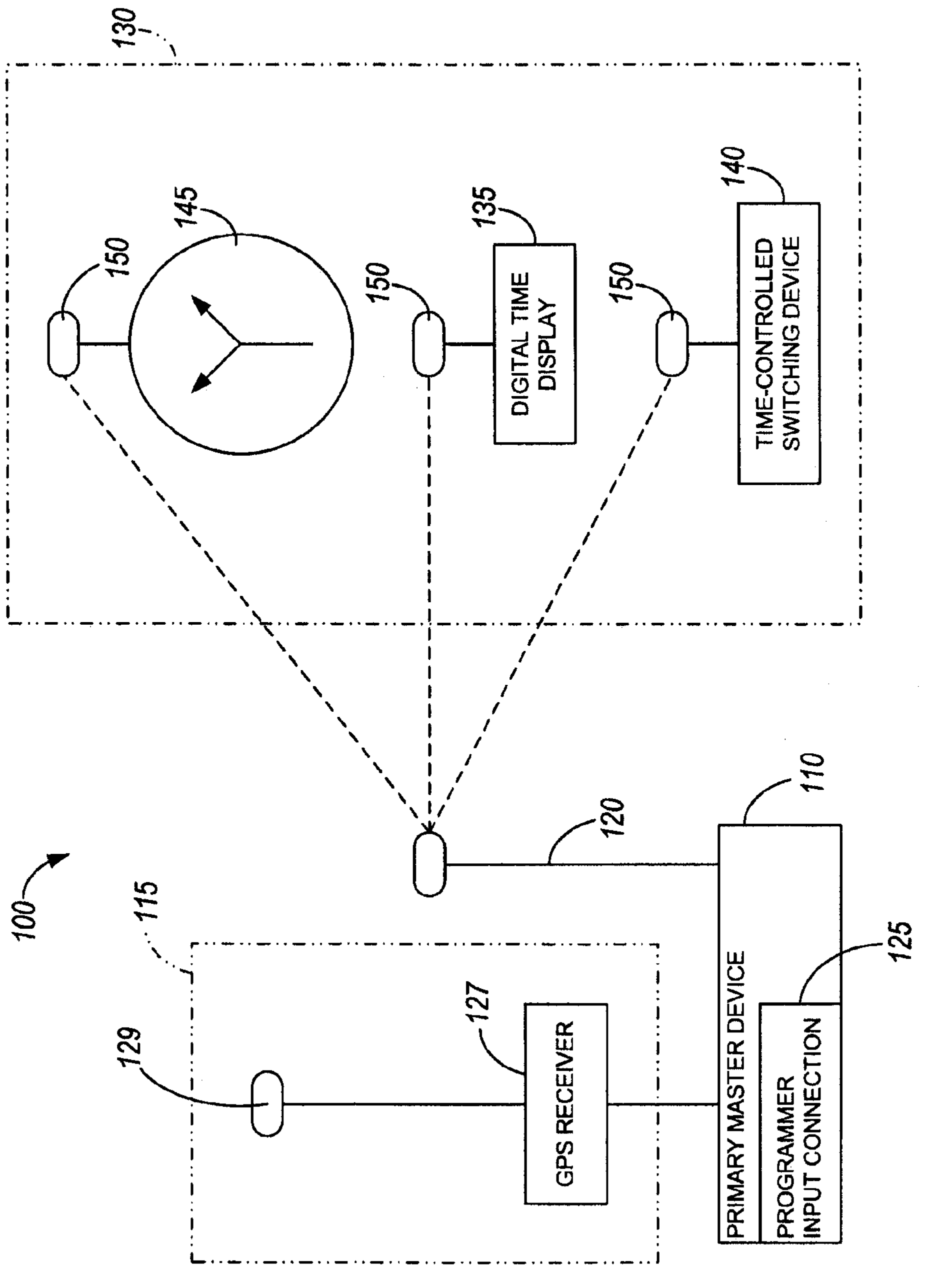
FIG. 1 shows a block diagram of a wireless synchronous time system according to the present invention including a master device which receives a GPS signal and broadcasts a time and programmed instruction to a system of slave devices.

Referring to FIG. 1, a wireless synchronous time system 100 in accordance with the present invention includes a primary "master" device 110, which receives a first time signal through a receiving unit 115 and broadcasts a second time signal to a plurality of "slave" secondary event devices 130. The receiving unit 115 can include a GPS receiver 127 having an antenna 129 which receives a global positioning system ("GPS") signal, including a GPS time signal component. The receiving unit 115 can send the GPS time signal component to the primary master device 110 where it is processed as further discussed below. In other embodiments, the primary device 110 can receive a first time signal from another system that may or may not include a GPS time signal component.

The primary master device 110 can further include a transmission unit 120, which wirelessly transmits a signal to the secondary or "slave" devices 130. In one embodiment, the signal sent to the slave devices 130 includes the processed GPS time signal component and/or a programmed instruction that is input to the primary master device 110 through a programmer input connection 125. The programmed instruction includes a preprogrammed time element and a preprogrammed function element which, along with the GPS time signal component, is transmitted by the primary master device 110 to synchronize the slave devices 130. In one construction, the processed GPS time signal component and the programmed instruction are wirelessly transmitted to the slave devices 130 at approximately a frequency between 72 and 76 MHz. In another construction, the processed GPS time signal component and the programmed instruction are wirelessly transmitted to the secondary devices 130 at a frequency of approximately 154 MHz.

FIG. 1 illustrates a few examples of secondary or slave devices 130. As shown in FIG. 1, examples of secondary or slave devices 130 can include an analog time display 145, a digital time display 135, and one or more switching devices 140, which may be associated with any one of a number of devices, such as a bell, a light, a lock, a speaker, etc. In other constructions, such as the construction illustrated in FIG. 4*b*, the secondary device 130 can also include such devices as a message board 147.

Each of the secondary devices 130 includes an antenna 150 to wirelessly receive the signal from the primary device 110, such as, for example, the processed GPS time signal component and the programmed instruction from the primary master device 110. Each of the secondary devices 130 also includes a processor (see FIG. 4, element 410 and FIG. 5, element 525, not shown in FIG. 1) to process the processed time signal and the programmed instruction received from the primary device 110. As will be further discussed below, in some constructions, when the preprogrammed time element of the programmed instruction matches a second time generated by the slave device, an event will be executed.

The primary device 110 may also transmit one or more programmed instructions (a "program") that may be executed by the processor of the secondary devices 130. The program may include a message to be displayed by a message board, a tone or wave file (a "sound file") to be generated by a speaker, an image file to be displayed by a monitor, or a function or algorithm to be performed on a data set. The secondary devices 130 may also store one or more programs in an internal memory and simply receive a direction of which program to retrieve from the internal memory and execute from the primary device 110. The primary device 110 may also transmit input parameters to the secondary devices 130 that the processor may use when executing a program.

For the analog time display 145, shown in FIG. 1, the event can include positioning an hour, minute, and second hand to visually display the current time. For the digital time display 145, the event can include digitally displaying the current time. For a time controlled switching device 140, the event may include any of a number of events that may be controlled by the switch. For example, a system of bells may include switches that sound the bells at a particular time. Alternatively, a system of lights may include switches which turn the lights on or off at a particular time. For the message board 147 (see FIG. 4*b*), in one construction, the event may include displaying a message stored in the board's memory at a certain time. In another construction, for the message board 147, the event may include displaying a message that accompanies the time component.

It will be readily apparent to those of ordinary skill in the art that the secondary devices may include any one of a number of electronic devices for which a particular functionality is desired to be performed at a particular time, such as televisions, radios, electric door locks, lights, etc.

Figure 2:
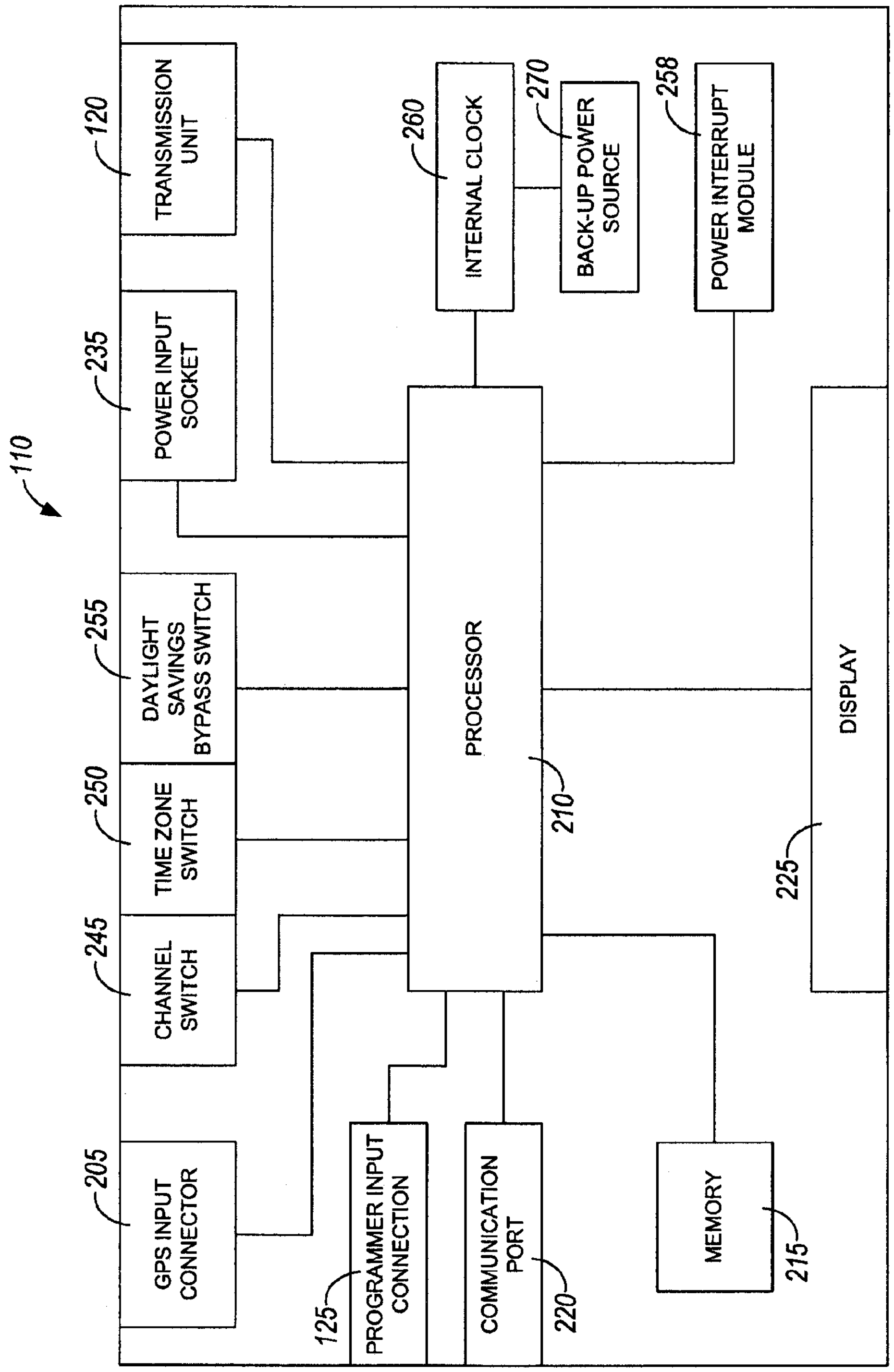
FIG. 2 shows a block diagram of the master device of FIG. 1.

Referring to FIG. 2, a detailed diagram of the primary master device 110 is shown. The primary master device 110 can receive a time signal component, such as the GPS time signal component from the receiving unit 115 (FIG. 1) at an input unit, such as the GPS time signal input receiving unit or connector 205. The primary master device 110 can further include a processor 210, a memory 215, a programmer input connector 125, a communication port 220, a display 225, a transmission unit 120, and a powered input socket 235. In some embodiments, these elements of the primary master device 110 serve to receive, process, and transmit information used to synchronize the slave units 130, as will be fully discussed below. The communication port 220 may be used to perform diagnostic testing or auditing or to perform software upgrades or modifications by an external computing device (i.e., a personal computer, a PDA, etc.). Additionally, a channel switch 245, time zone switch 250, and a daylight savings bypass switch 255 can be included in the primary master device 110. Lastly, in some embodiments, the primary master device 110 includes a power interrupt module 258 coupled to the processor 210 to retain the internal time and the programmed instruction in the event of a power loss.

In some embodiments, upon powering up the master device 110, the processor 210 can check the setting of the channel switch 245, the time zone switch 250, and the daylight savings bypass switch 255. The processor 210 stores the switch information into the memory 215. In some embodiments, a signal is received through the antenna 129 and a time signal component is extracted from it. For example, in some embodiments using a GPS time signal, a GPS signal is received through the antenna 129 and a GPS time signal component is extracted from it. When the receiving unit or connector 205 receives the GPS time signal component, the processor 210 adjusts it according to the switch information of the channel switch 245, the time zone switch 250, and the daylight savings bypass switch 255, and sets an internal clock 260 to the processed GPS time signal component to produce a first internal time.

The channel switch 245 enables a user to select a particular transmission frequency or range of frequencies determined best for transmission in the usage area, and to independently operate additional primary master devices in overlapping broadcast areas without causing interference between them. The GPS time signal uses a coordinated universal time ("UTC"), and requires a particular number of compensation hours to display the correct time and date for the desired time zone. The time zone switch 250 enables the user to select a desired time zone, which permits worldwide usage. The time zone switch 250 or a separate switch may also be used to compensate for fraction-of-an-hour time differences. For example, in some areas a half-an-hour time offset may be added to the received time component to generate a correct time. Lastly, the GPS time signal may or may not include daylight savings time information. As a result, users in areas that do not require daylight savings adjustment may be required to set the daylight savings bypass switch 255 to bypass an automatic daylight savings adjustment program. Manual daylight savings time adjustment can also be accomplished by adjusting the time zone switch 250 to a desired time zone retain a correct time.

Once the processor 210 adjusts the GPS time signal component according to the settings of the switches discussed above and sets the internal clock 260 to produce the first internal time, the internal clock 260 starts to increment the first internal time until another GPS time signal is received from the GPS receiver 127 (FIG. 1). Between receiving GPS time signals, the internal clock 260 independently keeps the first internal time which, in addition to date information and reception status, is displayed on the display 225. The internal clock 260 may also include a back-up power source 270 for retaining power to the internal clock if a primary power source (i.e., power supplied by an alternating current outlet) is lost, disrupted, or insufficient for supplying needed power to the master device 110. In some embodiments, the back-up power source 270 includes a battery. In addition to processing the time signal, the processor 210 also checks for a new programmed instruction on a continuous basis, and stores any new programmed instruction in the memory 215. As briefly mentioned above, to enter a programmed instruction, a user keys in the programmed instruction into a computing device (e.g., a personal computer, a PDA, etc.) and transfers the programmed instruction to the primary master device 110 through the programmer input connector 125. The programmed instruction is stored in the memory 215 and, along with the first internal time kept in the internal clock 260, is transmitted through the transmission unit 120 at the transmission frequency set in the channel switch 245.

Figure 3A:
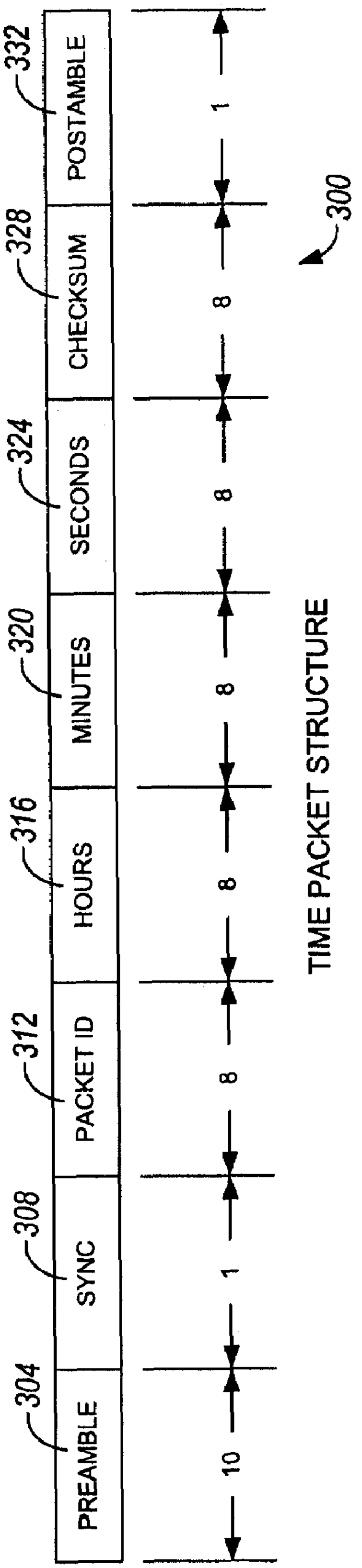
FIG. 3A shows a time package structure used in the transmission of the time element of FIG. 1.
Figure 3B:
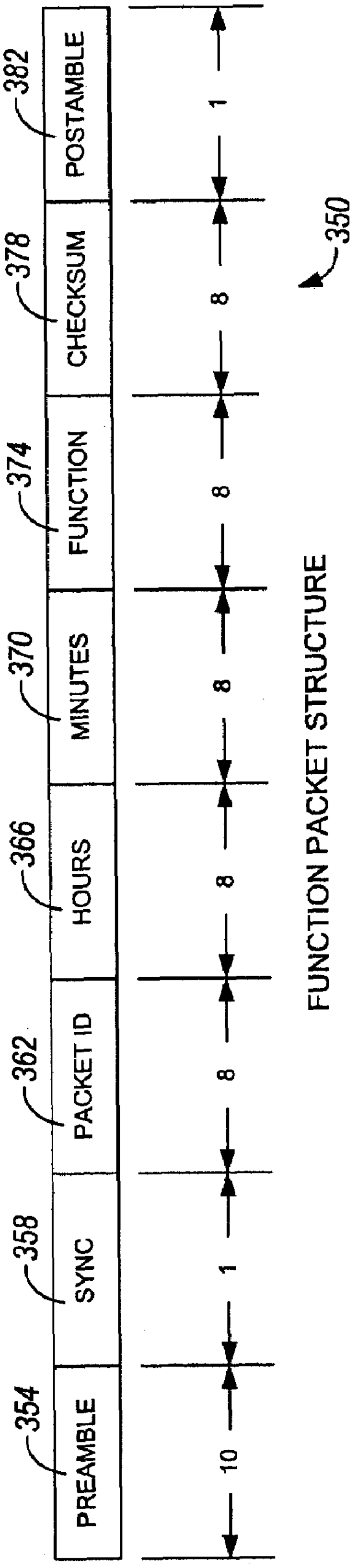
FIG. 3B shows a function package structure used in the transmission of the programmed instruction element of FIG. 1.

The first internal time and the programmed instruction are transmitted by the master device 110 using a data protocol as shown in FIGS. 3A and 3B. FIG. 3A shows a time packet structure 300 comprising of preprogrammed time element, and having a 10-bit preamble 304, a sync bit 308, a packet identity byte 312, an hour byte 316, a minute byte 320, a second byte 324, a checksum byte 328 and a postamble bit 332. FIG. 3B shows a function packet structure 350 comprising a preprogrammed function element, and having a 10-bit preamble 354, a sync bit 358, a packet identity byte 362, an hour byte 366, a minute byte 370, a function byte 374, a checksum byte 378, and a postamble bit 382.

Each secondary slave device 130 receives the signal broadcast by the master device 110 including information according to the time packet structure of FIG. 3A and the function packet structure FIG. 3B. The secondary slave device attempts to match the packet identity bytes 312 or 362 with an internal identity number programmed in the processor of the secondary slave device (i.e., 410 of FIG. 4 or 525 of FIG. 5) to selectively register the program instruction. It should be readily apparent to those of ordinary skill in the art that the time packet structure 300 and the function packet structure 350 may have a different structure size so that more or less information may be transmitted using these packets. For example, the time packet structure may include, in addition to the existing timing bytes, a month byte, a day byte, a year byte, and a day of the week byte. Similarly, the function packet structure 350 may include additional hour, minute, and function bytes to terminate the execution of an event triggered by the hour, minute, and function bytes 366, 370, and 374, shown in FIG. 3B.

Figure 4:
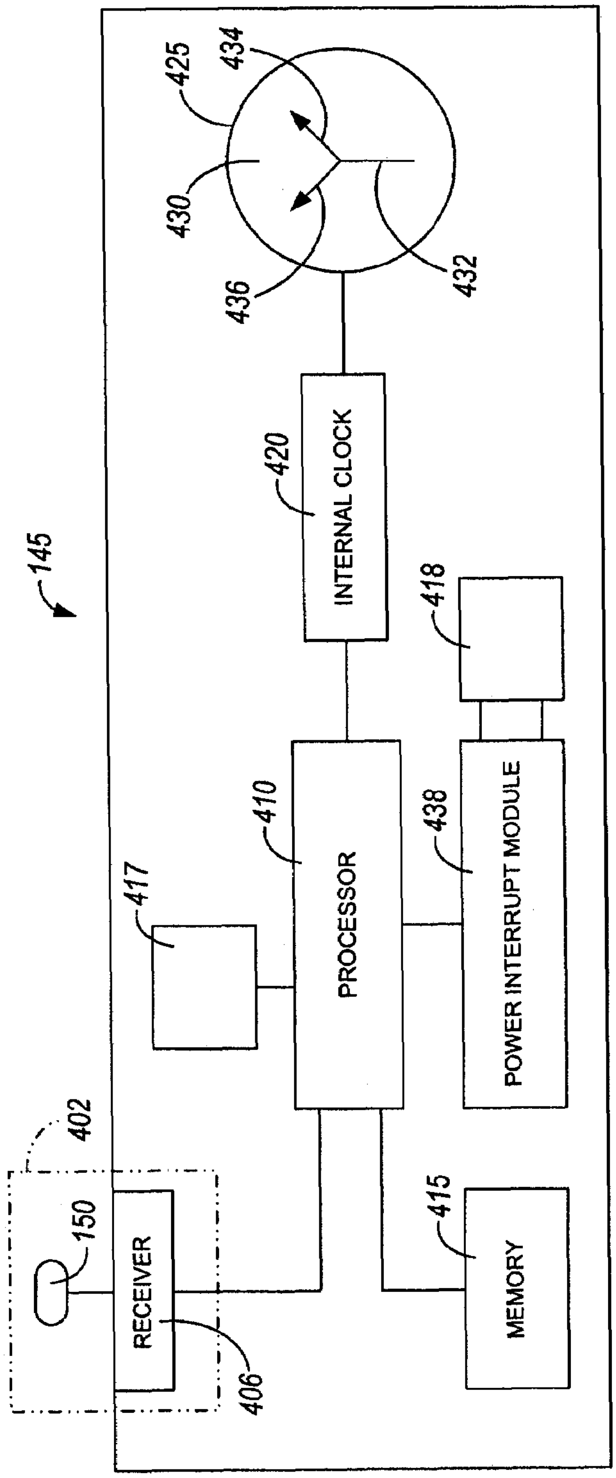
FIG. 4 shows a block diagram of an analog clock slave device of FIG. 1.
Figure 4A:
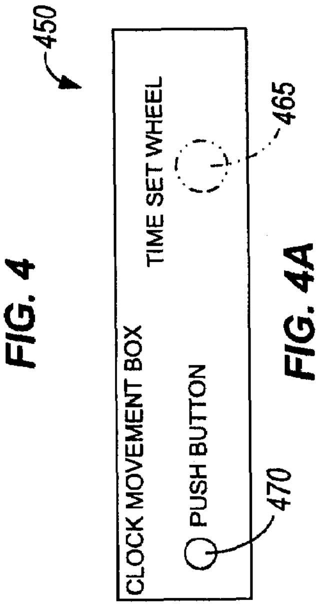
FIG. 4*a* shows a clock movement box used in the setting of the slave clock of FIG. 4.
Figure 4B:
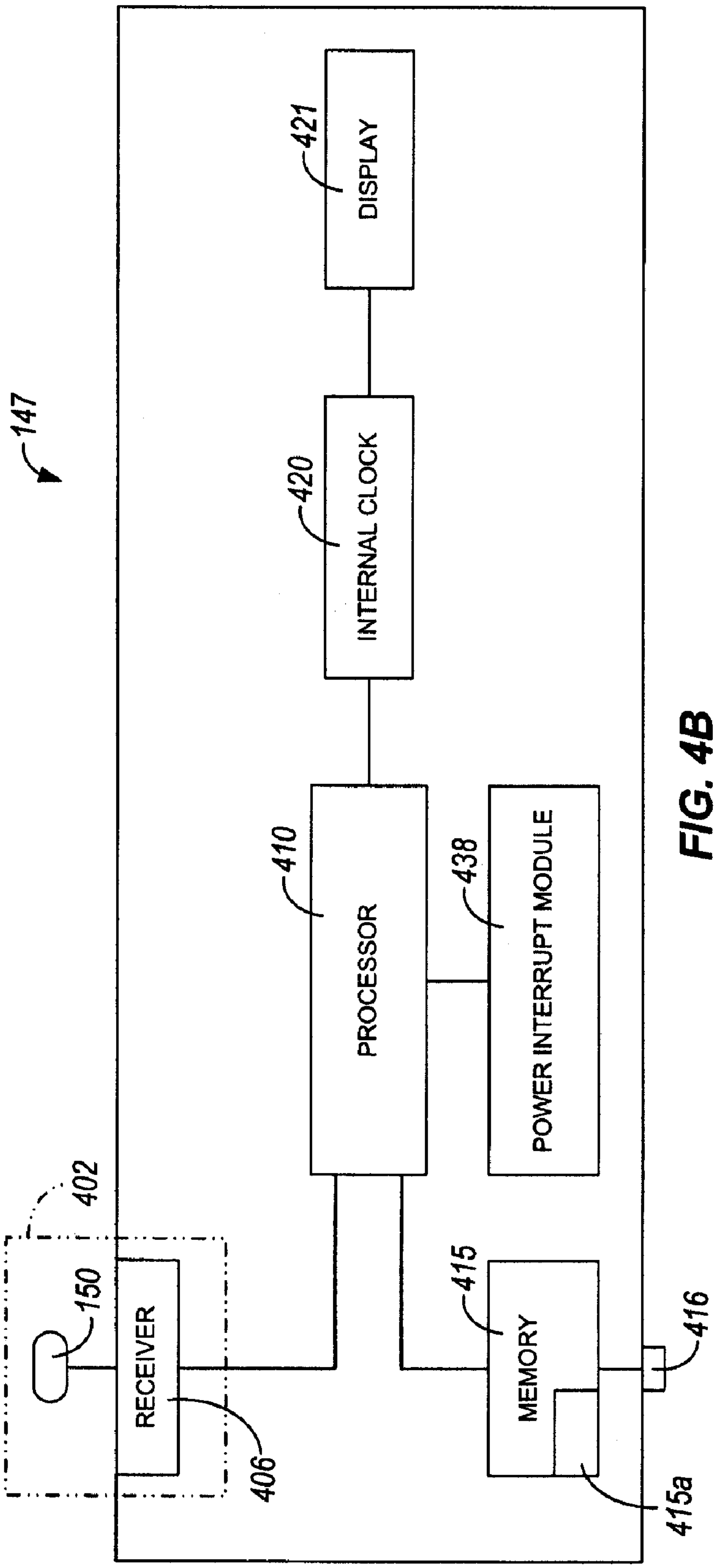
FIG. 4*b* shows a block diagram of a secondary device of FIG. 1.
Figure 5A:
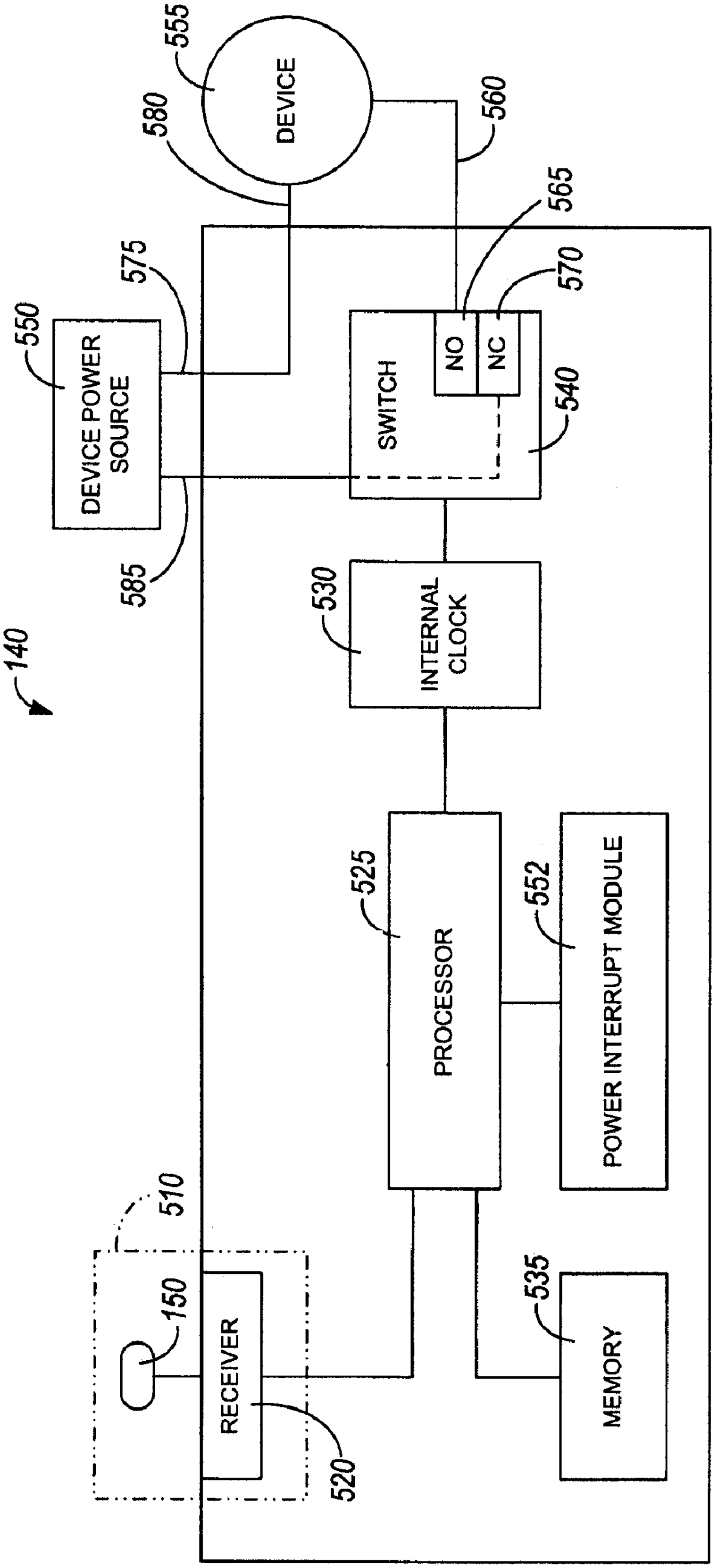
FIG. 5*a* shows a block diagram of a slave device of FIG. 1, which includes a switch for controlling the functionality of the device.

A diagram of the analog slave clock 145 of FIG. 1 is shown in FIG. 4. The slave clock 145 includes a second receiving unit 402 having an antenna 150 and a second receiver 406. The slave clock 145 also includes a second processor 410, a second memory 415, a second internal clock 420 and an analog display 425. The analog display 425 includes a set of hands 430 including a second hand 432, a minute hand 434, and an hour hand 436. As with the master device 110, the secondary slave clock 145 also includes a power interrupt module 438 coupled to the processor 410 to retain an internal time and a programmed instruction in the event of a power loss to the slave clock 145.

In some constructions, the secondary devices 130 can also include an indicator 417 that indicates whether the secondary device 130 is receiving any signals from the primary device 110. In one construction, the indicator 417 can include a light emitting diode ("LED") that flashes in response to every incoming signal received and processed by the secondary device 130. In another construction, the indicator 417 can include an LED that flashes after a certain period of time elapses during which the secondary device 130 does not receive any signal from the primary device 110. In other constructions, the indicator 417 can include a speaker operable to indicate the reception or lack of reception of a signal with an audible indication.

In some constructions, the indicator 417 can also be used to indicate the execution of an instruction. For example, an LED may flash or a speaker may transmit a sound or recording that indicates that an event will occur, is occurring, or has occurred, such as the locking of a door or the turning off of a light.

In some constructions, the secondary devices 130 also include a power source 418. In the illustrated construction of FIG. 4, the power source 418 includes a battery, such as a D-size battery, for example. The second devices 130 may also include a solar panel or other generally portable power source. In these constructions, the secondary devices 130 do not need to be placed within an area with a power source readily available, such as, for example, within a certain area of an alternating current ("AC") outlet that can have a generally fixed position that limits the placement of the secondary device 130. In some constructions, the primary device 110 may include a generally portable power source such as battery or solar panel.

FIG. **4*a* illustrates a clock movement box 450 having a manual time set wheel 465, and a push button 470 for setting the position of the hands 430 of the analog display 425. The clock movement box 450 is of the type typically found on the back of conventional analog display wall clocks, and is used to set such clocks. In setting the analog slave clock 145, the manual time set wheel 465 of the clock movement box 450 is initially turned until the set of hands 430 shows a time within 29 minutes of the GPS time (i.e., the actual time). When power is applied to the slave analog clock 145, the second hand 432 starts to step. The push button 470 of the clock movement box 450 is depressed when the second hand reaches the 12 o'clock position. This signals to the second processor 410 that the second hand 432 is at the 12 o'clock position, enabling the second processor 410 to "know" the location of the second hand 432. The push button 470 is again depressed when the second hand 432 crosses over the minute hand 434, wherever it may be. This enables the second processor 410 to "know" the location of the minute hand 434 on the clock dial. (See U.S. patent application Ser. No. 09/645,974 to O'Neill, the disclosure of which is incorporated by reference herein). The second processor 410** may also "know" the location of the hands of the clock dial by optically detecting the position of gears within the clock that determine the position of the hands or the hands themselves.

To synchronize itself to the master device 110, the second receiver 406 of the slave device 145 automatically and continuously or periodically searches a transmission frequency or a channel that contains the first internal time and the programmed instruction. When the receiving unit 402 wirelessly receives and identifies the first internal time, the processor 410 stores the received first internal time at the second internal clock 420. The second internal clock 420 immediately starts to increment to produce a second internal time. The second internal time is kept by the second internal clock 420 until another first internal time signal is received by the slave clock 145. If the processor 410 determines that the set of hands 430 displays a lag time (i.e., since a first internal time signal was last received by the slave clock 145, the second internal clock 420 had fallen behind), the processor 410 speeds up the second hand 432 from one step per second to a rate greater than one step per second until both the second hand 432 and the minute hand 434 agree with the newly established second internal time. If the processor 410 determines that the set of hands 430 shows a lead time (i.e., since the first internal time signal was last received by the slave clock 145, the second internal clock 420 had moved faster than the time signal relayed by the master device), the processor 410 slows down the second hand 432 from one step per second to a rate less than one step per second until both the second hand 432 and the minute hand 434 agree with the newly established second internal time.

FIG. **4*b* illustrates a message board 147, which is another example of a secondary device 130 for use in the synchronous system 100. In some constructions, the message board 147 includes similar components to the slave clock 145, such as, for example, a receiving unit 402, a processor 410, memory 415, a power interrupt module 438, and an internal clock 420. The message board 147 further includes a display 421. In some constructions, the message board 147 can store preprogrammed messages in a portion 415*a* of memory 415. The messages can be hardwired into the memory portion 415*a* or can be manually entered via a programmer input connector 416. In other constructions, the messages are stored in the primary device 110 and are wirelessly transmitted to the board 147. In these constructions, the processor 410 can parse the signal, extract the message and the time at which the message is to be displayed, and store that information in memory 415. In further constructions, the message board 147 can also include an analog clock movement unit (not shown) to display time or can show the time on the display 421**.

In addition to slave clocks that display the synchronized time signal, a slave device 130 may include one or more switching slave devices 140 as depicted in FIGS. **5*a* and 5*b*. Instead of simply displaying a time signal, the switching slave device 140** utilizes a time signal to execute an event at a particular time, such as displaying a message on a message board, for example. In this way, a system of slave switching devices can be synchronized.

The slave switching device 140 includes a second receiving unit 510 having an antenna 150 and a second receiver 520, a second processor 525, a second internal clock 530, a second memory 535, an operating switch 540, and a device power source 550. The secondary slave switching device 140 further includes a power interrupt module 552 coupled to the processor 410 to retain the internal time and the programmed instruction on a continuous basis, similar to the power interrupt module of the master device 110 and the slave clock 145. The secondary slave switching device 140 includes any one of a number of devices 555, which is to be synchronously controlled. Depending upon the device 555 to be controlled, a first end 560 of the device 555 is coupled to a normally open end ("NO") 565 or a normally closed end ("NC") 570 of the operating switch 540. The first power lead 575 of the device power source 550 is also coupled to a second end 580 of the device 555, and a second power lead 585 of the device power source 550 is configured to be coupled to the normally open end 565 or the normally closed end 570 of the operating switch 540. The operating switch 540 may close and/or open a connection between the second power lead 585 and the normally open end 565 or normally closed end 570 of the operating switch 540 to break or complete a circuit that provides operating power or instructions to the device 555. It will be readily apparent to those of ordinary skill in the art that the device 555 and operating switch 540 may be constructed and operated in other constructions and/or manners than those illustrated and described. For example, the operating switch 540 may generate and transmit operating power and/or instructions over a wireless connection, such as over a radio frequency or infrared signal, to the device 555. The device 555 receives the operating power and/or instructions and begins and/or stops operating or modifies its operation as instructed.

Figure 5B:
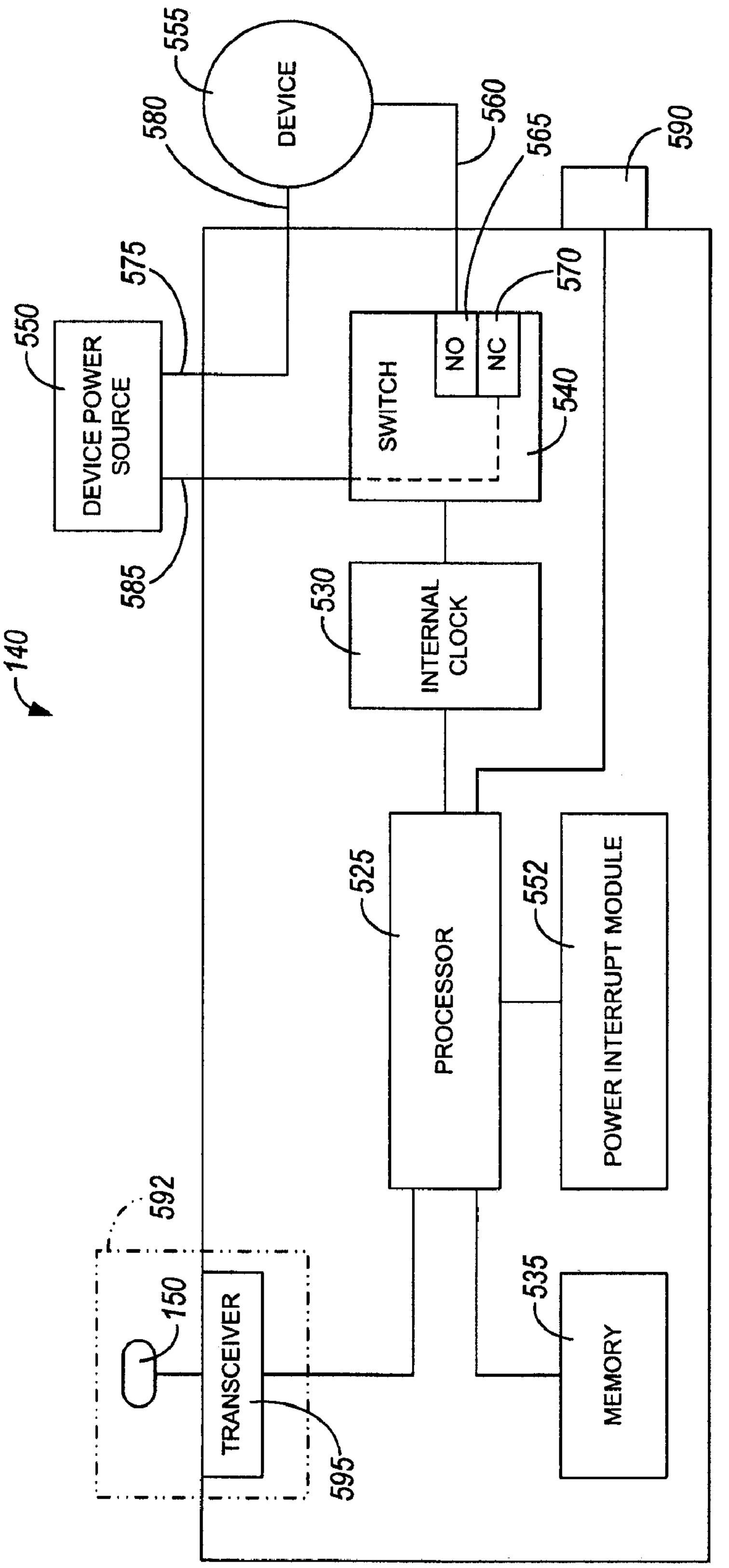
FIG. 5*b* shows a block diagram of another slave device of FIG. 1, which includes a switch for controlling the functionality of the device.

As shown in FIG. 5*b*, the switching device 140 can also include one or more sensors 590. In some constructions, the sensor(s) 590 provides feedback regarding a performed event. For example, once an event is executed, such as closing and locking a door at a certain time, the sensor(s) 590 can verify whether the event was performed.

In other constructions, the sensor(s) 590 can provide an additional input factor for determining whether an event should take place. For example, the sensor 590 can include one or more motion detectors and an event can include turning off overhead lights at a certain time. If the motion detector (s), however, detects someone within a specified proximity, the processor 525 can determine not to execute the event (e.g., turn off the lights) at the scheduled time. Furthermore, feedback from the sensor(s) 590 can provide additional functionality, such as providing announcement of the execution of an event or enabling a warning once an event has been executed. For example, a buzzer or recording via a speaker can sound prior to an event, such as closing and locking a door. Also, the buzzer or recording can sound if someone attempts to open a door after a certain time.

Still referring to FIG. 5*b*, the secondary devices 130 can also record information from the one or more sensors 590 in memory 535. In some constructions, the devices 130 may include additional non-volatile memory. The secondary device 130 can also maintain a record of its operation in memory 535.

In some constructions, the memory 535 can also store time adjustment information such as daylight savings information, time zone information, etc. The time adjustment information can serve as a back-up in the event the secondary device 130 does not receive a signal from the primary device 110 or receives a signal from the primary device 110 that requires additional time adjusting than that performed by the primary device 110. For example, a group of secondary devices 130 may receive identical signal from a primary device 110, but one of the secondary devices 130 may process the received signal to display the time in one time zone (i.e., the time in New York) and another secondary device 130 may process the received signal to display the time in another time zone (i.e., the time in Paris).

In some constructions, the system 100 also allows for two-way communication between secondary devices 130 and primary device 110. In these constructions, the secondary device 130 can include a transceiving unit 592 (see FIG. 5*b*) in place of the second receiving unit 402 or can include both the second receiving unit 402 and a second transmitting unit (not shown). In these constructions, signals are transmitted at a frequency of approximately 154 MHz between the primary device 110 and the secondary device 130. The transceiving unit 592 may be operable to receive a second signal from the primary device 110 and transmit a third signal to the primary device 110.

In some constructions, like the receiver 406 of the slave clock 145, the second receiver 520 of the slave switching device 140 automatically searches a transmission frequency or a channel that contains a first internal time and a programmed instruction from the master device 110. When the receiving unit 510 wirelessly receives and identifies the first internal time, the second processor 525 stores the received first internal time in a second internal clock 530. The second internal clock 530 immediately starts to increment to produce a second internal time until another first internal time signal is received from the master device 110.

Additionally, in some constructions, the programmed instruction can be stored in the memory 535. When there is a match between the second internal time and the preprogrammed time element of the programmed instruction, the preprogrammed function element will be executed. For example, if the preprogrammed time element contains a time of day, and the preprogrammed functional element contains an instruction to switch on a light, the light will be switched on when the second internal clock 530 reaches that time specified in the preprogrammed time element of the programmed instruction.

In other constructions, the switching device 140 does not store programmed instructions in memory 535. Rather, switching device 140 may receive instructions from the signal received from the primary device 110.

Figure 6:
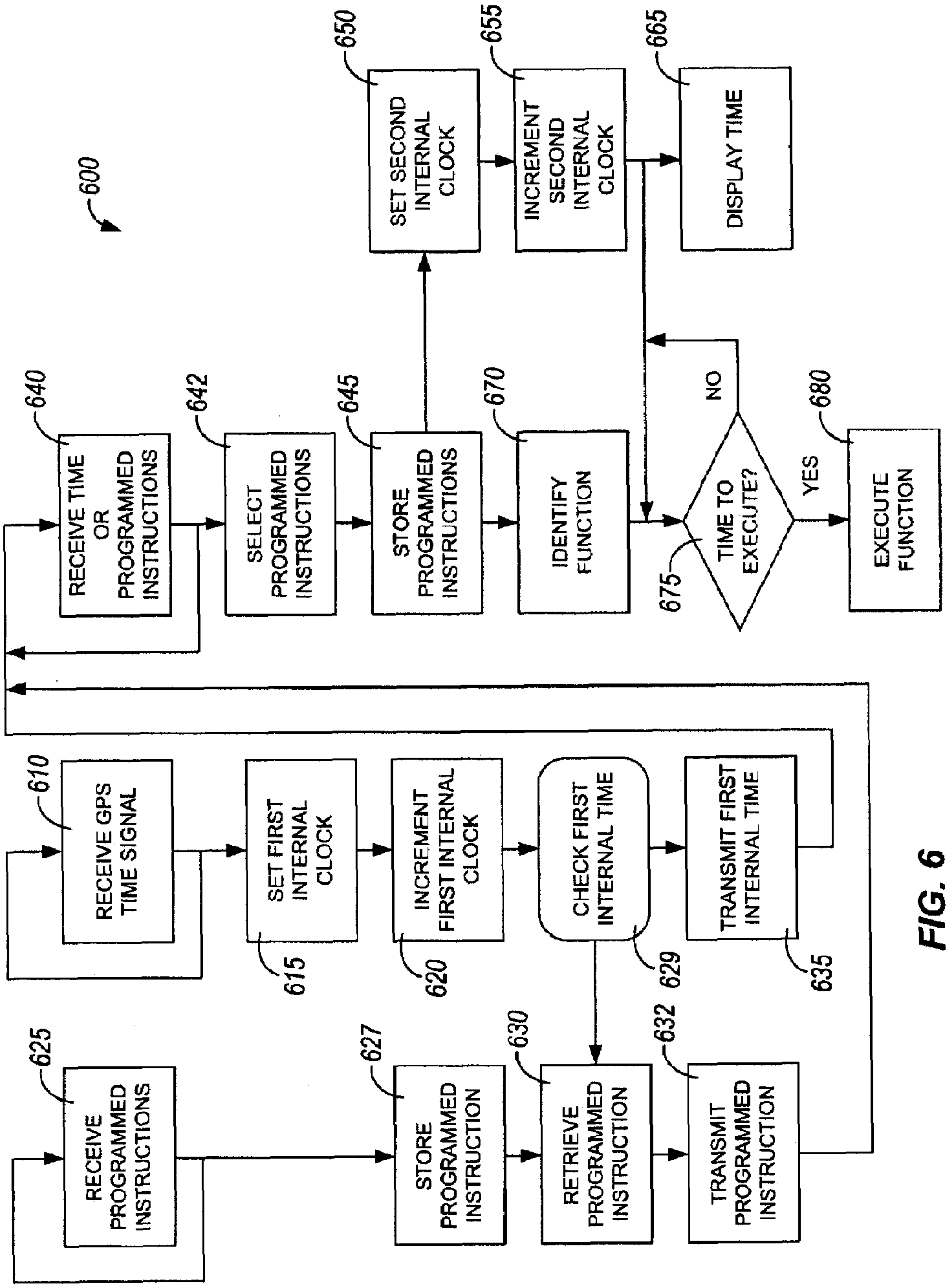
FIG. 6 shows a flow chart illustrating the functionality of a wireless synchronous time system in accordance with the present invention.

Referring to FIG. 6, a flow chart 600 illustrates a wireless synchronous time system according to the present invention. The flow chart 600 illustrates the steps performed by a wireless synchronous time system according to the present invention for any number of systems of slave devices. The process starts in a receiving step 610 where a master device receives a GPS time signal. As indicated in the flow chart at step 610, the master device will continuously look for and receive new GPS time signals. Next, at step 615, a first internal clock is set to the received GPS time. Next, the first internal clock will start to increment a first internal time in step 620. In a parallel path, at step 625, the master device receives programmed instructions input by a user of the system. Again, the flow chart indicates that the master device is able to continuously receive programmed instructions so that a user may add additional programmed instructions to the system at any time. As discussed above, the programmed instructions will include a preprogrammed time element and a preprogrammed function element. The programmed instruction is then stored in a first memory at step 627. Next, when preset periodic times are reached at step 629, the programmed instruction is retrieved at step 630 and transmitted at step 632 to the slave device along with the first internal time at step 635. In other words, when the first internal clock reaches particular preset times (e.g., every five minutes) the programmed instruction and the first internal time are wirelessly transmitted to the slave devices. The intermittent transmissions may conserve power consumption of the master device and slave devices, since the frequency of wireless transmission can be regulated such that the devices operate with low power consumption.

The programmed instruction and/or the first internal time are received at the slave device in step 640. If the slave device is to merely synchronously display a time, such as a clock, but does not perform any functionality, there is no need to receive a programmed instruction. In slave devices such as bells, lights, locks, etc., in addition to the first internal time, at step 642, the processor will select those programmed instructions where the packet identity byte matches an identity of the slave device. The selected programmed instruction is then stored or registered in memory at the secondary slave device in step 645. A second internal clock is then set to the first internal time at step 650 to produce a second internal time. In step 655, like the first internal clock, the second internal clock will start to increment the second internal time. The second internal time is displayed at step 665. Meanwhile, a function is identified from the preprogrammed function element at step 670. When the second internal time has incremented to match the preprogrammed time element at step 675, the function identified from the preprogrammed function element is executed in step 680. Otherwise, the secondary slave device will continue to compare the second internal time with the preprogrammed time element until a match is identified.

It will be readily understood by those of ordinary skill in the art, that both the first internal clock and the second internal clock increment, and thus keep a relatively current time, independently. Therefore, if, for some reason, the master device does not receive an updated GPS time signal, it will still be able to transmit the first internal time. Similarly, if, for some reason, the slave device does not receive a signal from the master device, the second internal clock will still maintain a relatively current time. In this way, the slave device will still display a relatively current time and/or execute a particular function at a relatively accurate time even if the wireless communication with the master device is interrupted. Additionally, the master device will broadcast a relatively current time and a relatively current programmed instruction even if the wireless communication with a satellite broadcasting the GPS signal is interrupted. Furthermore, the power interrupt modules of the master and slave devices help keep the system relatively synchronized in the event of power interruption to the slave and/or master devices.

In some constructions and in some aspects, the wireless synchronous time system 100 can include a primary device, one or more secondary devices, and one or more repeating devices. In some constructions, the primary device refers to the device that receives an initial reference time signal from a source, such as, for example, a source external to the system 100 (e.g., a GPS time signal from a GPS satellite). In these constructions, the repeating devices can be used to extend the coverage area of the system 100.

Figure 7:
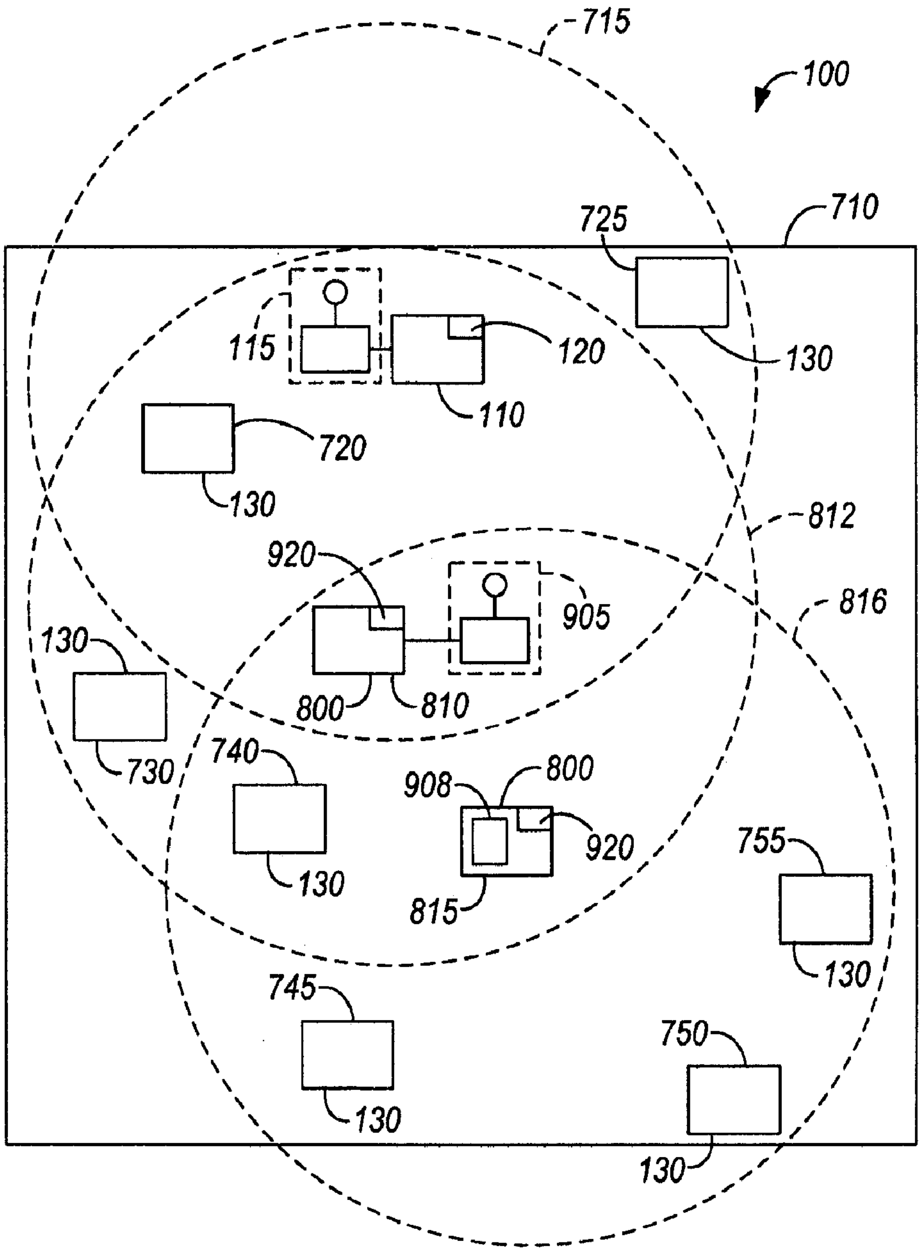
FIG. 7 shows a schematic diagram of a wireless synchronous time keeping system.

For example, in the embodiment illustrated in FIG. 7, the system 100 can be used to synchronize certain devices within a desired area 710. In some constructions, for example, the area 710 can include a building, such as an office building, a school, a department store, a hospital, a hotel, or the like. In other constructions, for example, the area 710 can include multiple buildings, such as a campus.

As shown in FIG. 7, the system 100 includes a primary device 110. In the illustrated embodiment, the primary device 110 is coupled to a receiving unit 115. In some constructions, the receiving unit 115 can receive a GPS time signal or another signal with a time component. In other constructions, the receiving unit 115 can receive a terrestrial signal. In further constructions, the receiving unit 115 can receive another satellite signal.

In the illustrated embodiment, the primary device 110 further includes a transmitting unit 120. The transmitting unit 120 can wirelessly transmit a signal across a first coverage area 715 to one or more secondary devices 130. As shown in FIG. 7, the primary device 110 can transmit signals to a first secondary device 720 and a second secondary device 725, both of which are included in the first coverage area 715. In other constructions, the system 100 can include more or fewer secondary devices 130 within the first coverage area 715 of the primary device 110.

In the illustrated embodiment, the area 710 in which the system 100 operates within is larger than the first coverage area 715 of the primary device 110. Furthermore, the system 100 also includes additional secondary devices 130 that are not positioned within the first coverage area 715 of the primary device 110, such as, for example, a third secondary device 730, a fourth secondary device 740, a fifth secondary device 745, a sixth secondary device 750, and a seventh secondary device 755. In some constructions, such as the illustrated embodiment, these additional secondary devices 130 receive signals from the primary device 110 via one or more repeating devices 800.

As shown in FIG. 7, for example, the third secondary device 730 and the fourth secondary device 740 receive signals from the primary device 110 via a first repeating device 810. In this embodiment, the first repeating device 810 is positioned within the first coverage area 715 of the primary device 110 and is equipped to receive signals transmitted from the primary device 110. Furthermore, in some constructions, the first repeating device 810 can be equipped to retransmit the signals to secondary devices 130 within a second coverage area 812. As shown in FIG. 7, the third secondary device 730 and the fourth secondary device 740 are positioned within the second coverage area 812 of the first repeating device 810 and outside the first coverage area 715 of the primary device 110.

Also shown in FIG. 7, the fifth secondary device 745, the sixth secondary device 750 and the seventh secondary device 755 are each positioned outside both the first coverage area 715 of the primary device 110 and the second coverage area 812 of the first repeating device 810. In the illustrated embodiment, these secondary devices 130 receive the signals from the primary device 110 via a second repeating device 815 transmitting within a third coverage area 816. As shown in FIG. 7, the second repeating device 815 is positioned within the second coverage area 812 of the first repeating device 810 and outside the first coverage area 715 of the primary device 110.

Figure 8:
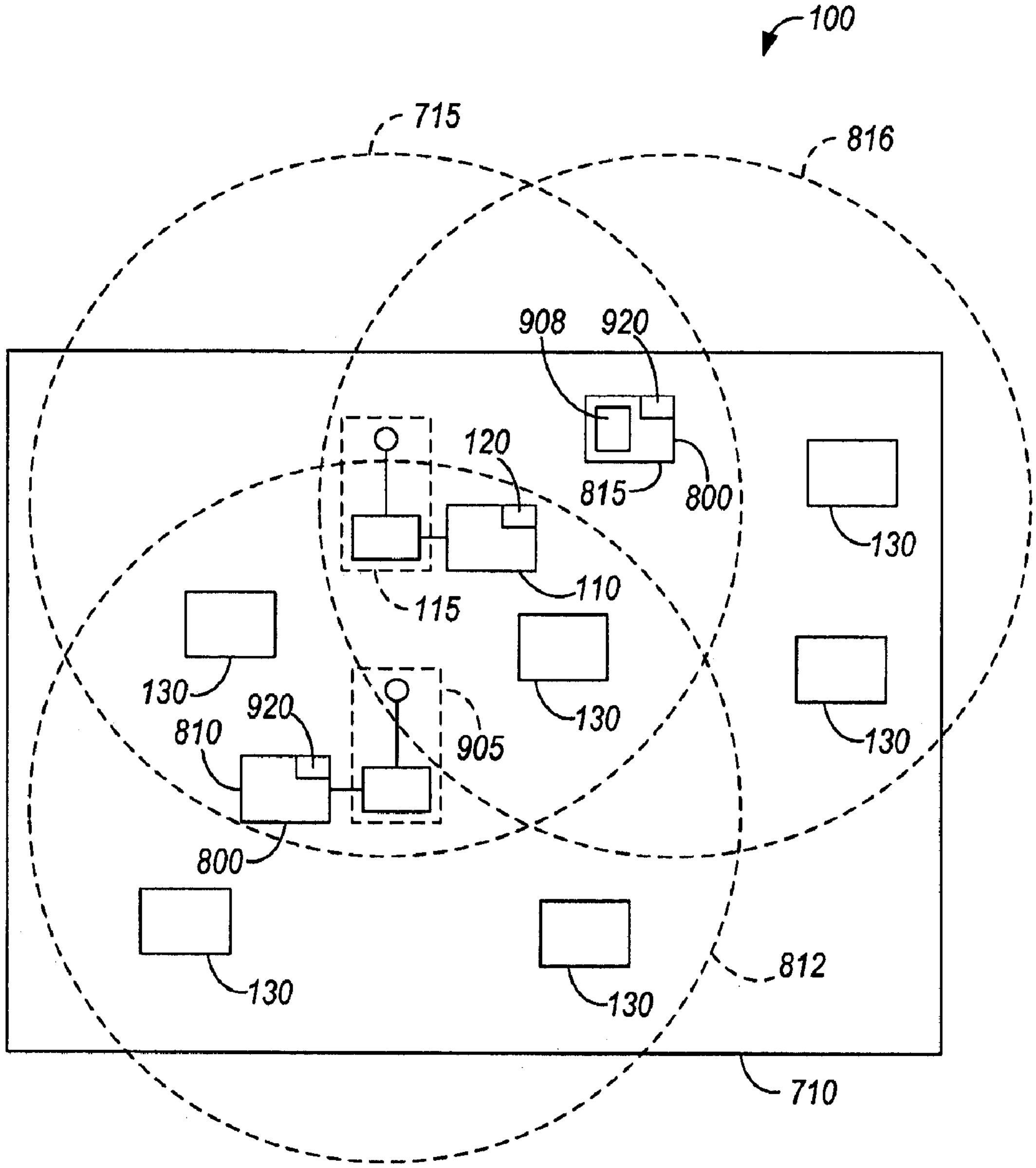
FIG. 8 shows another schematic diagram of a wireless synchronous time keeping system.

Another example of the location of the devices within the system is shown in FIG. 8. In this construction, for example, each repeating device 800 can be located within the first coverage area 715 of the primary device 110.

In some constructions, the overlapping regions of the coverage area of the primary device 110 (such as, for example, the first coverage area 715) and the coverage area of the repeating device 800 (such as, for example, the second coverage area 812) can vary for different applications. For example, the system 100 can be used to synchronize various devices 130 within a multi-story building. Even though the primary device 110 may be able to transmit throughout the entire building, repeating devices 800 can be included in order to strengthen the signals from the primary device 110.

In some constructions, as mentioned previously, the repeating devices 80 can be equipped to retransmit the signals received from the primary device 110 to secondary devices 130 within a particular coverage area. In other constructions, the repeating devices 800 can be equipped to process the signals transmitted by the primary device 110 and transmit processed signals or different signals to the secondary devices 130 within the particular coverage area. For example, the signal sent by the primary device 110 (e.g., the primary signal) may include a time and an instruction. In some constructions, a repeating device 800, such as the first repeating device 810, can process the signal and extract the time information and the instruction. Furthermore, the repeating device 800 can be equipped to modify the instruction, remove the instruction, and/or replace the instruction with a second instruction. Also, in some constructions, the repeating device 800 can modify the time information included in the primary signal and transmit updated time information to the secondary devices 130. In these constructions, the repeating device 110 can modify the time to reflect instances of daylight savings or time zone changes, for example.

In further constructions, the repeating devices 800 can receive a second signal from the primary device 110 on a first frequency. For example, the second signal can include a time and an instruction. A repeating device 800 can receive the second signal, process the second signal and transmit a third signal at a second frequency to another device such as another repeating device 800 or a secondary device 130. The third signal can include the time and the instruction from the second signal or can include one of a modified time and a modified instruction. In some constructions, the first frequency and the second frequency may be the same frequency. The first frequency and the second frequency may also be different frequencies.

Figure 9:
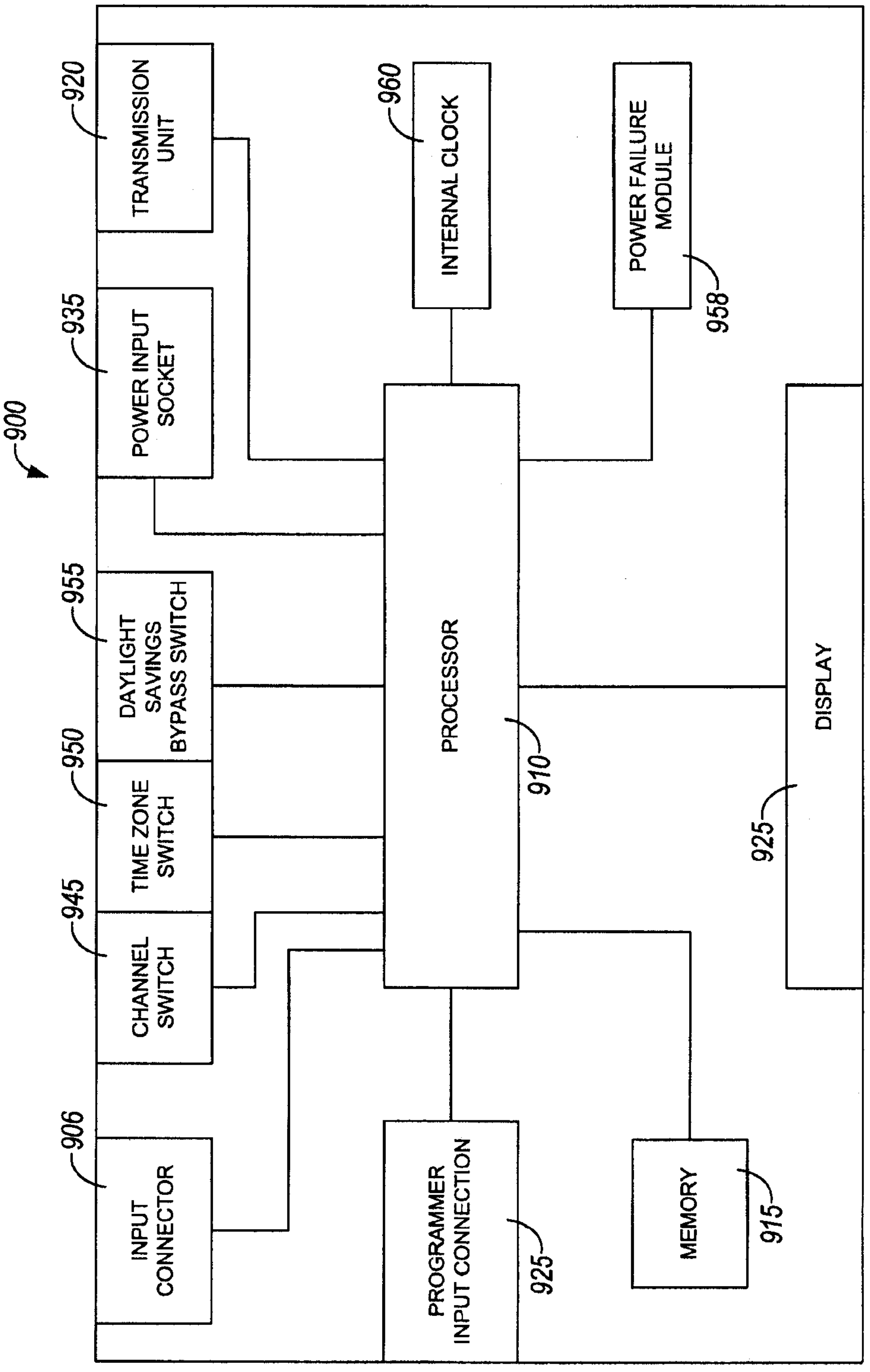
FIG. 9 shows a block diagram of a repeating device for use in a wireless synchronous time keeping system, such as the systems illustrated in FIGS. 7 and 8.
Figure 10:
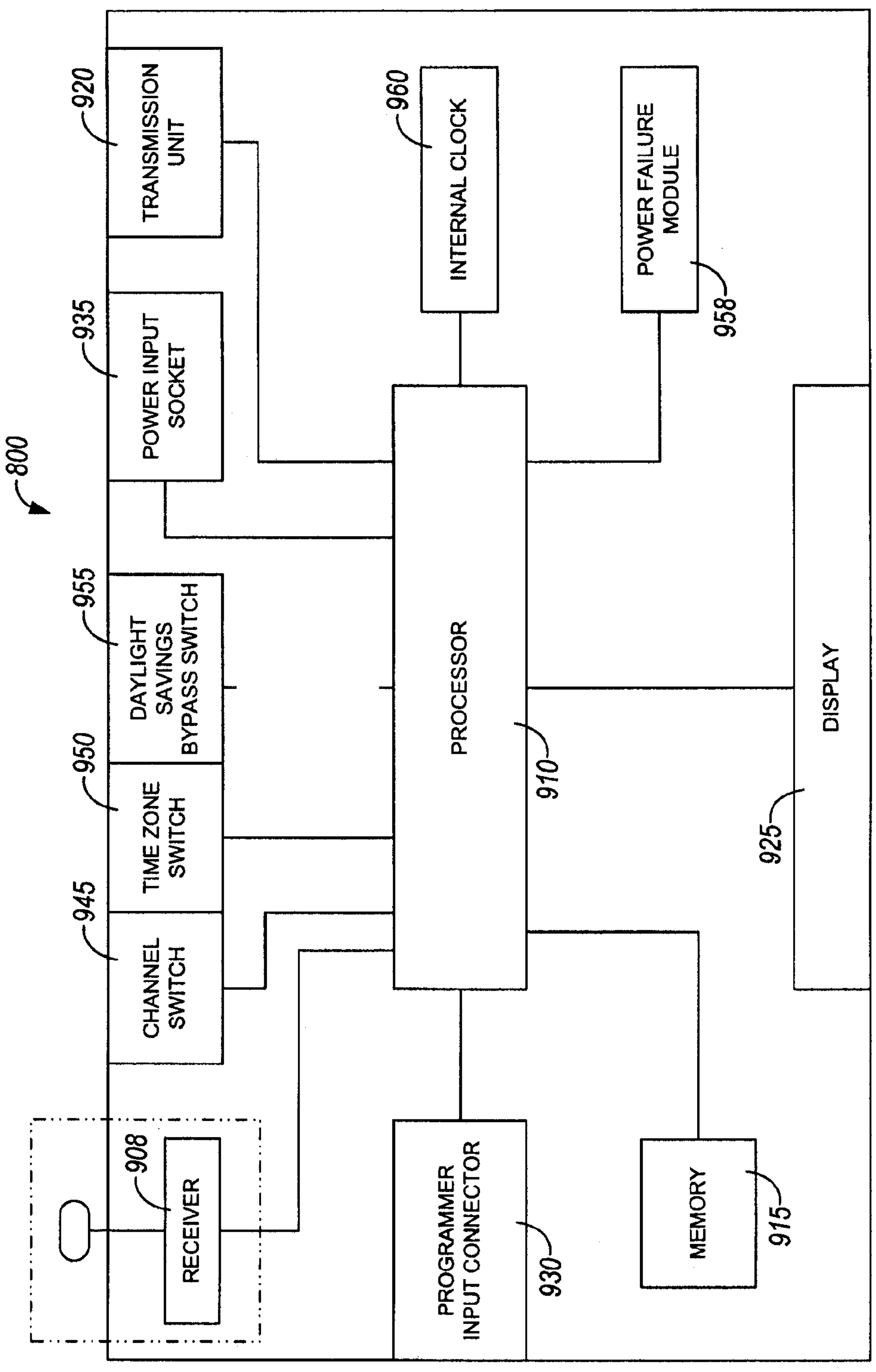
FIG. 10 shows another block diagram of a repeating device for use in a wireless synchronous time keeping system, such as the systems illustrated in FIGS. 7 and 8.

FIGS. 9 and 10 illustrate examples of repeating devices 800 for use in the wireless system 100. In some constructions, such as the constructions illustrated in FIGS. 7, 8 and 9, the repeating device 800 can include components similar to the primary device 110. As shown the illustrated constructions, the repeating device 800, such as the first repeating device 810, can include an input connector 906 coupling it to an external receiving unit 905. In other constructions, such as the construction shown in FIG. 10, the repeating device 800, such as the second repeating device 815 (shown in FIGS. 7 and 8) can include an internal receiving unit 908.

Similar to the primary device 110, the repeating device 800 can include processor 910, memory 915, a transmission unit 920, a display 925, a programmer input connector 930, a power input socket 935, a channel switch 945, a time zone switch 950, a daylight savings bypass switch 955, a power failure module 958, and an internal clock 960. In some constructions, the repeating device 800 includes fewer modules than shown and described in FIGS. 9 and 10. In other constructions, the repeating device 800 includes additional modules. In further constructions, the repeating device 800 includes fewer modules than the primary device 110. For example, in one construction, the repeating device 800 may only include an internal receiving unit 906, a processor 910, a memory 915, a transmission unit 920, and an internal clock 960. In still further constructions, the repeating device 800 includes more modules than the primary device 110.

In other constructions, the repeating device 800 may receive an initial reference time signal from an external source, such as a GPS satellite, and may transmit the received time signal to the primary device. For example, the repeating device 800 may be placed outdoors or in another environment that provides a clear and generally unobstructed path for the reception of an initial reference or first signal with a first time component. Upon receiving the first signal, the repeating device 800 may process the first signal, as described above, to produce a second time component. For example, the repeating device 800 may modify the first time component to account for daylight savings or time zones. The repeating device 800 may also transmit the time component of the first signal without processing it. The repeating device 800 transmits a second signal to the primary device 110 that includes the second time component. In some constructions, the repeating device 800 may receive the first signal on a first frequency and may transmit the second signal to the primary device 110 on a second frequency. The second frequency may be a lower frequency that has better material penetration than the first frequency.

Upon receiving the second signal, the primary device 110 may operate as previously described for systems without a repeating device 800. In some constructions, the primary device 110 processes the second signal to produce a third time component and transmits the third time component and a programmed instruction and/or event in a third signal to a secondary device 130. The primary device 110 may also transmit the third signal to a repeating device 800.

It is to be understood that the invention is not limited in its application to the details of construction and the arrangement of components set forth in the above description or illustrated in the drawings. The invention is capable of other embodiments and of being practiced or being carried out in various ways. Also, it is to be understood that the phraseology and terminology used herein is for the purpose of description and should not be regarded as limited. The use of "including" and "comprising" and variations thereof herein is meant to encompass the items listed thereafter in accordance thereof as well as additional items. Although the invention has been described in detail with reference to certain embodiments, variations and modifications exist within the scope and spirit of the invention as described and defined in the following claims.

The invention claimed is:

1. A wireless synchronous time keeping system comprising:

a primary device including
- a first receiving unit to receive a first signal, the first signal including a time component,
- a first processor coupled to the first receiving unit and operable to process the first signal to produce a processed time component,
- a first internal clock to store the processed time component and to increment the component thereafter to produce a first internal time, and
- a transmitting unit to transmit a second signal, the second signal including the first internal time and an event, the event including an instruction and a time element; and a secondary device including
- a second receiving unit to receive the second signal,
- a second internal clock to store the first internal time and to increment the first internal time thereafter to produce a second internal time,
- a memory operable to store one or more messages,
- a display operable to display the one or more message, and
- an event switch operable to execute the instruction when the second internal time matches the time element, wherein the instruction includes displaying at least one of the one or more messages on the display.

2. The system of claim 1, wherein the secondary device further includes a programmer input connector operable to receive programming information including the one or more messages.

3. The system of claim 1, wherein the secondary device further includes a clock.

4. The system of claim 3, wherein the instruction further includes displaying a time on the clock.

* * * * *